(12) United States Patent
Chang

(10) Patent No.: US 7,893,906 B2
(45) Date of Patent: Feb. 22, 2011

(54) DISPLAY DEVICE HAVING IMPROVED SUBSTRATE AND METHOD OF MANUFACTURE

(75) Inventor: Jong-Woong Chang, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 800 days.

(21) Appl. No.: 11/861,971

(22) Filed: Sep. 26, 2007

(65) Prior Publication Data

US 2008/0079681 A1 Apr. 3, 2008

(30) Foreign Application Priority Data

Sep. 28, 2006 (KR) ...................... 10-2006-0094605

(51) Int. Cl.
*G09G 3/36* (2006.01)
(52) U.S. Cl. ...................... 345/90; 257/262; 349/146
(58) Field of Classification Search ................... 345/87, 345/90, 103; 349/146; 257/262
See application file for complete search history.

(56) References Cited

U.S. PATENT DOCUMENTS

| 7,327,431 B2* | 2/2008 | Chae et al. ................... 349/156 |
| 2002/0180901 A1* | 12/2002 | Kim ............................ 349/43 |
| 2007/0024793 A1* | 2/2007 | Yoo et al. .................... 349/141 |
| 2007/0103611 A1* | 5/2007 | Park et al. ..................... 349/40 |
| 2009/0251615 A1* | 10/2009 | Tsubata ....................... 348/725 |

FOREIGN PATENT DOCUMENTS

CN 1647282 7/2005

* cited by examiner

*Primary Examiner*—Nitin Patel
(74) *Attorney, Agent, or Firm*—Innovation Counsel LLP

(57) ABSTRACT

A display device having improved aperture ratio includes a switching element, a liquid crystal capacitor and a storage capacitor. The switching element is electrically connected to a gate line and a source line crossing each other. The liquid crystal capacitor has a pixel electrode electrically connected to the switching element through a first contact to define a pixel area. The storage capacitor has a storage line partially overlapping the source line. The storage line is electrically connected to the pixel electrode through a second contact hole.

20 Claims, 12 Drawing Sheets

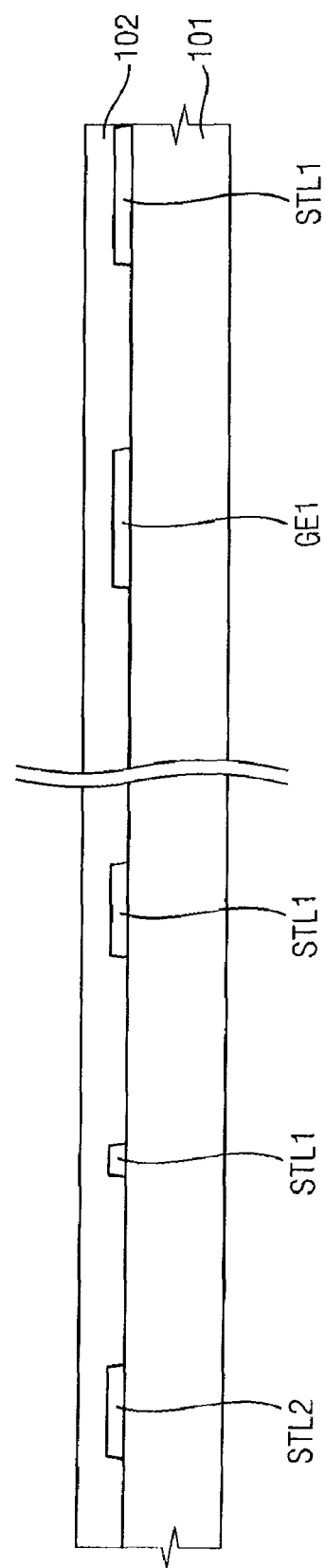

DISPLAY DEVICE HAVING IMPROVED SUBSTRATE AND METHOD OF MANUFACTURE

CROSS-REFERENCE TO RELATED APPLICATIONS

This application claims priority under 35 U.S.C. §119 to Korean Patent Application No. 2006-94605, filed on Sep. 28, 2006 in the Korean Intellectual Property Office (KIPO), the contents of which are herein incorporated by reference in their entirety.

BACKGROUND OF THE INVENTION

1. Field of the Invention

The present invention relates to a display device and, more particularly, to a display device having a substrate offering an improved aperture ratio, and a method of manufacturing the display substrate.

2. Description of the Related Art

Generally, a liquid crystal display (LCD) device includes an LCD panel with upper and lower substrates facing each other, and a liquid crystal layer interposed between the substrates. The LCD panel includes a plurality of pixel sections. Each of the pixel sections includes a switching element and a liquid crystal capacitor. The switching element is formed on the lower substrate. A first end portion of the liquid crystal capacitor is electrically connected to the switching element, and a second end portion of the liquid crystal capacitor is electrically connected to a common electrode formed on the upper substrate. A pixel voltage is charged in the liquid crystal capacitor by a voltage difference between a data voltage provided from the switching element and a common voltage applied to the common electrode.

That is, the LCD device displays an image using light transmittance that corresponds to a variation of the charging quantity of the liquid crystal capacitor. In the LCD device, a response time is defined as a time during which a transmittance ratio is changed from about 10% to about 90%. A driving condition and/or a liquid crystal condition may be improved to improve the response time of the LCD device.

A power source voltage as the driving condition may be increased to improve the response time; however, power consumption of the LCD device is also increased. A liquid crystal material having a lower dielectric constant as the liquid crystal condition may be employed in the LCD device to improve the response time; however, liquid crystal material development may have reached its limitations.

SUMMARY OF THE INVENTION

According to one aspect of the present invention, a display device having improved aperture ratio and response time includes a switching element, a liquid crystal capacitor and a storage capacitor. The switching element is electrically connected to a gate line and a source line crossing each other. The liquid crystal capacitor has a pixel electrode electrically connected to the switching element through a first contact to define a pixel area. The storage capacitor has a storage line partially overlapping the source line. The storage line is electrically connected to the pixel electrode through a second contact hole. The capacitance ratio ((Cpix-Clc)/Clc) between the liquid crystal capacitor and the storage capacitor is about 0.4 to about 0.6, wherein Cpix denotes a total capacitance of the capacitor formed in the pixel area, Clc denotes the capacitance of the liquid crystal capacitor, and Cst denotes the capacitance of the storage capacitor.

The liquid crystal capacitor is defined by the pixel electrode, a common electrode facing the pixel electrode and a liquid crystal layer interposed between the pixel electrode and the common electrode.

The storage capacitor includes the storage line, a gate insulation layer formed on the storage line, a source line formed on the gate insulation layer that overlaps the storage line, an organic insulation layer formed on the source line, and the pixel electrode partially overlapped with the source line.

For example, the switching element may be electrically connected to an (n)th gate line and an (m)th source line, wherein n and m denote natural numbers. The storage line is overlapped with the (m)th source line and an (m−1)th source line and is formed in one of an upper portion of the pixel area and a lower portion of the pixel area in plan view. The storage line has a U-shape with its open end facing toward the (n)th gate line or an (n−1)th gate line. The storage line overlaps the (m)th source line or the (m−1)th source line when viewed from a plan view of the display device.

According to another aspect of the present invention, a display device includes a gate line, a source line, a storage line and a pixel electrode. The source line crosses the gate line. The storage line is formed from the same layer as the gate line. The storage line partially overlaps the source line. The pixel electrode is partially overlapped with the source line to define a pixel area. The pixel electrode is electrically connected to the storage line.

In still another aspect of the present invention, in order to manufacture a display substrate, a storage line is independently formed in each of pixel areas of a base substrate having a plurality of pixel areas defined thereon. A gate insulation layer is formed on the storage line. A source line is formed on the gate insulation layer. The source line overlaps the storage line. A pixel electrode is formed on the source line to overlap a portion of the source line.

According to the display device, the display substrate and the method of manufacturing the display substrate, a storage capacitor is designed to maintain a capacitance ratio according to a design condition that optimizes response time, so that the aperture ratio of the pixel section may be increased.

BRIEF DESCRIPTION OF THE DRAWINGS

The above and other advantages of the present invention will become readily apparent by reference to the following detailed description when considered in conjunction with the accompanying drawings, in which.

DESCRIPTION OF THE EMBODIMENTS

Figure 1:
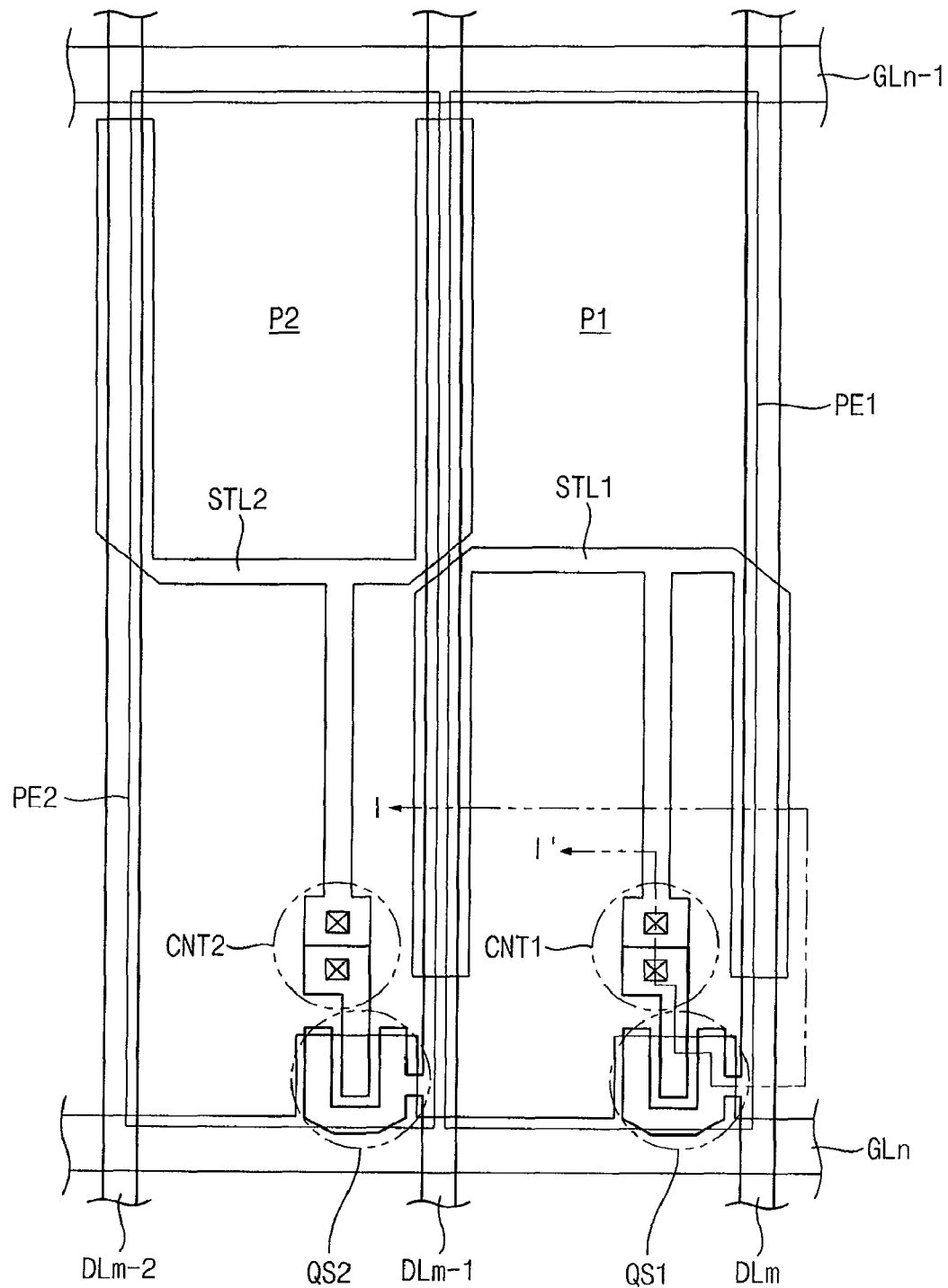
FIG. 1 is a plan view illustrating a display device according to a first exemplary embodiment of the present invention.

The invention is described more fully hereinafter with reference to the accompanying drawings, in which embodiments of the invention are shown. In the drawings, the size and relative sizes of layers and regions may be exaggerated for clarity. It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Hereinafter, the present invention will be described in detail with reference to the accompanying drawings.

Exemplary Embodiment 1

FIG. 1 is a plan view illustrating a display device according to a first exemplary embodiment of the present invention.

Referring to FIG. 1, a display device includes a plurality of gate lines GLn-1 and GLn, a plurality of storage lines STL1 and STL2, a plurality of source lines DLm-2, DLm-1 and DLm, a plurality of switching elements QS1 and QS2, and a plurality of pixel electrodes PE1 and PE2, wherein m and n denote natural numbers. The switching elements QS1 and QS2 may include a thin-film transistor (TFT), respectively.

The gate lines GLn-1 and GLn are extended along a first direction, and the source lines DLm-2, DLm-1 and DLm are extended along a second direction crossing the first direction. In one exemplary embodiment, the gate lines GLn-1 and GLn and the source lines DLm-2, DLm-1 and DLm define a first pixel area and a second pixel area, however the first pixel area and the second pixel area also be otherwise defined.

For example, a first pixel section P1 is formed in the first pixel section. The first pixel section P1 includes a first switching element QS1, a first storage line STL1 and a first pixel electrode PE1. The first switching element QS1 is electrically connected to an (n)th gate line GLn and an (m)th source line DLm. The first storage line STL1 is formed below (m-1)th and (n)th source lines DLm-1 and DLm to overlap with the (m-1)th and (n)th source lines DLm-1 and DLm when viewed from a plan view of the display device. The first pixel electrode PE1 is electrically connected to the first switching element QS1 and the first storage line STL1 through a first contact hole CNT1. The first contact hole CNT1 is formed adjacent to the first switching element QS1 to prevent an aperture ratio from decreasing.

The first storage line STL1 is formed below the (m-1)th and (m)th source lines DLm-1 and DLm, and has a U-shape opened toward the (n)th gate line GLn. The first pixel electrode PE1 is overlapped with a portion of the (m-1)th and (m)th source lines DLm-1 and DLm.

A first storage capacitor of the first pixel section P1 is defined by the first storage line STL1, the (m-1)th and (m)th source lines DLm-1 and DLm and the first pixel electrode PE1 that are overlapped with each other.

A second pixel section P2 is formed in the second pixel section. The second pixel section P2 includes a second switching element QS2, a second storage line STL2 and a second pixel electrode PE2. The second switching element QS2 is electrically connected to an (n)th gate line GLn and an (m-1)th source line DLm-1. The second storage line STL2 is formed below (m-2)th and (m-1)th source lines DLm-2 and DLm-1 to overlap with the (m-2)th and (m-1)th source lines DLm-2 and DLm-1 when viewed from a plan view of the display device. The second pixel electrode PE2 is electrically connected to the second switching element QS2 and the second storage line STL2 through a second contact hole CNT2. The second contact hole CNT2 is formed adjacent to the second switching element QS2 to prevent an aperture ratio from decreasing.

The second storage line STL2 is formed below the (m-2)th and (m-1)th source lines DLm-2 and DLm-1, and has a U-shape opened toward the (n-1)th gate line GLn-1. Therefore, each of the first and second storage lines STL1 and STL2 is formed on and below the (m-1)th source line DLm-1, respectively, to cross each other based on the (m-1)th source line DLm-1.

The second pixel electrode PE2 is formed to overlap the (m-1)th and (m-2)th source lines DLm-1 and DLm-2, in plan view.

A second storage capacitor of the second pixel section P2 is defined by the second storage line STL2, the (m-1)th and (m-2)th source lines DLm-1 and DLm-2 and the second pixel electrode PE2 that overlap each other.

According to the above exemplary embodiment, the aperture ratio of the pixel section is increased because it is not necessary to prepare an additional area for forming a storage line at each pixel section since the storage line overlaps the source line area.

Further, the capacitance ratio ((Cpix-Clc)/Clc) of the pixel section is designed to be about 4.5 to about 5.0, so that the response time may be optimized at about 16 ms. The total capacitance of a pixel section, the capacitance of the liquid crystal capacitor and the capacitance of the storage capacitor are respectively denoted by Cpix, Clc and Cst.

Therefore, the size of the storage line is designed within the source line area such that the capacitance ratio ((Cpix-Clc)/Clc) is about 4.5 to about 5.0 and so that the response time may be maintained at about 16 ms.

Alternatively, the thickness of the gate insulation layer, which is disposed between the storage line and the source line to define the storage capacitance, is about 0.4 μm so that a relatively high capacitance may be formed in a relatively small size. Therefore, although the resolution is high, that is, the size of the pixel section is large (i.e., a capacitance of a liquid crystal Clc is high), it is possible to have the capacitance ratio ((Cpix-Clc)/Clc) be about 4.5 to about 5.0.

It is to be noted that while the storage line, the source line and the pixel electrode define the storage capacitor, forming the storage capacitance using the storage line to overlap the source line reduces the effect of any misalignment of the source line and the pixel electrode. Thus, the vertical line error generated by the variation ratio of the storage capacitance may be decreased.

Figure 2:
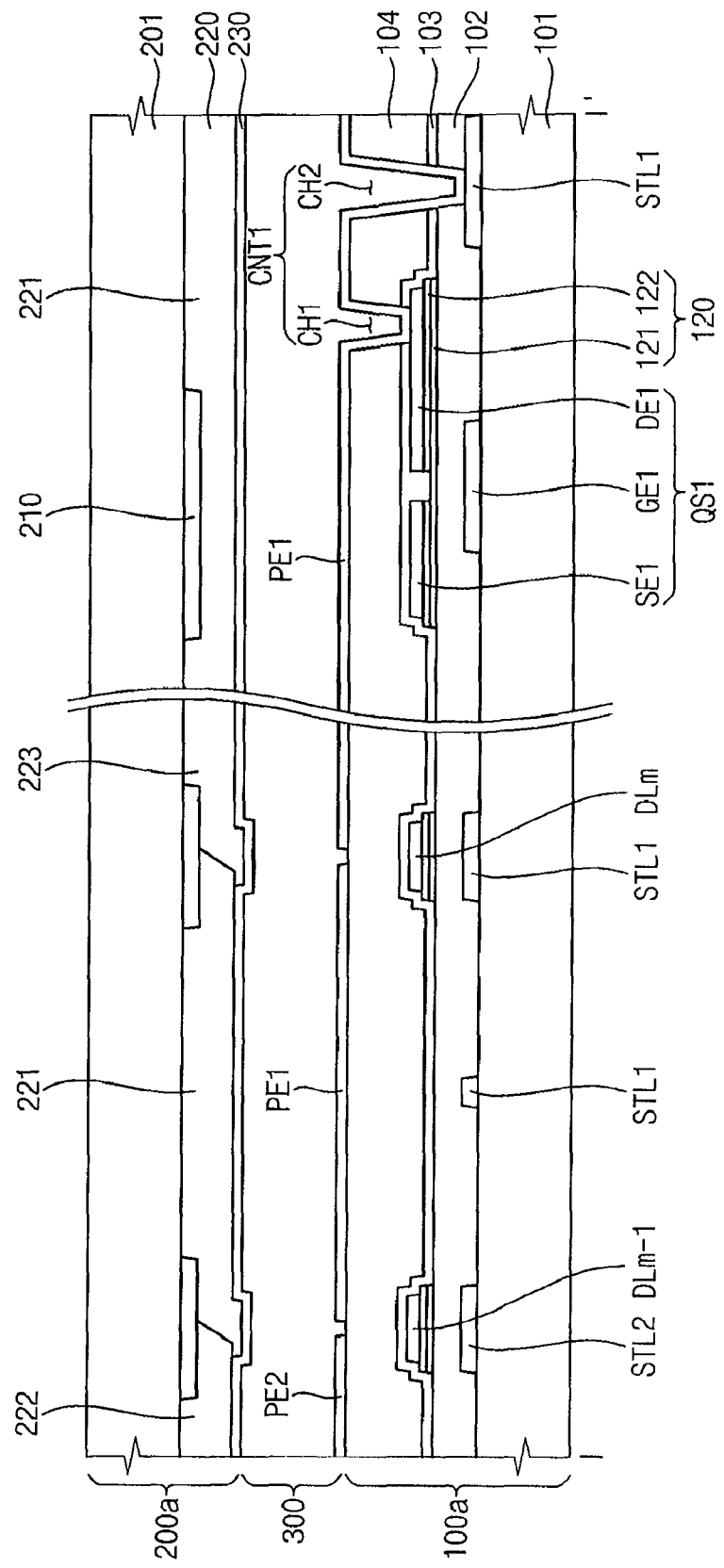
FIG. 2 is a cross-sectional view illustrating a display device cut along a line I-I' in FIG. 1.

FIG. 2 is a cross-sectional view illustrating a display device cut along a line I-I' in FIG. 1.

Referring to FIGS. 1 and 2, the display device includes a display substrate 100a, an opposite substrate 200a that faces the display substrate 100a and a liquid crystal layer 300 interposed between the substrates 100a and 200a.

The display substrate 100a includes a first base substrate 101. A gate pattern as a gate metal layer is formed on the first base substrate 101. The gate pattern includes an (n−1)th gate line GLn-1, an (n)th gate line GLn, a first storage line STL1, a second storage line STL2, a first gate electrode GE1 and a second gate electrode GE2.

A gate insulation layer 102 is formed on the gate pattern. A source pattern including a channel layer 120 and a source metal layer is formed on the gate insulation layer 102. The channel layer 120 includes an activation layer 121 having amorphous silicon (a-Si) and an ohmic contact layer 122 having n+amorphous silicon (n+a-Si) that is heavily doped with an n-type impurity.

The source pattern includes source lines DLm-2, DLm-1 and DLm, source electrodes SE1 and SE2 and drain electrodes DE1 and DE2.

A passivation layer 103 and an organic insulation layer 104 are sequentially formed on the source pattern. A first contact hole CH1 and a second contact hole CH2 are formed through the passivation layer 103, the organic insulation layer 104 being formed on the passivation layer 103. A first pixel electrode PE1 is formed on the organic insulation layer 104 having the first and second contact holes CH1 and CH2 formed thereon. The first contact hole CH1 electrically connects to the first pixel electrode PE1 and the switching element QS1, and the second contact hole CH2 electrically connects to the first pixel electrode PE1 and the first storage line STL1.

As a result, the first storage capacitor of the first pixel section P1 is defined by the first storage line STL1, the gate insulation layer 102 formed on the first storage line STL1, the (m)th and (m−1)th source lines DLm and DLm-1, the passivation layer 103 formed on the (m)th and (m−1)th source lines DLm and DLm-1, the organic insulation layer 104 formed on the passivation layer 103, and the first pixel electrode PE1 formed on the organic insulation layer 104.

Although not shown in FIGS. 1 and 2, the second storage capacitor of the second pixel section P2 is defined by the second storage line STL2, the gate insulation layer 102 formed on the second storage line STL2, the (m−1)th and (m−2)th source lines DLm-1 and DLm-2, the passivation layer 103 formed on the (m−1)th and (m−2)th source lines DLm-1 and DLm-2, the insulation layer 104 formed on the passivation layer 103, and the second pixel electrode PE2 formed on the organic insulation layer 104.

The opposite substrate 200a includes a second base substrate 201. A light-blocking pattern 210 is formed on the second base substrate 201, which divides a light transmitting area that transmits light from a light-blocking area that blocks light. For example, the light-blocking pattern 210 may be formed corresponding to the gate lines GLn-1 and GLn, the source lines DLm-2, DLm-1 and DLm and the switching elements QS1 and QS2.

A color filter layer 220 is formed in a light-transmitting area defined by the light-blocking pattern 210. The color filter layer 220 may include a red filter pattern 221, a blue filter pattern 222 and a green filter pattern 223.

A common electrode 230 that faces the first and second pixel electrodes PE1 and PE2 is formed on the color filter layer 220. Therefore, the first liquid crystal capacitor of the first pixel section P1 is defined by the first pixel electrode PE1, the liquid crystal layer 300 and the common electrode 230. Moreover, the second capacitor of the second pixel section P2 is defined by the second pixel electrode PE2, the liquid crystal layer 300 and the common electrode 230.

FIGS. 3A to 6 are plan and cross-sectional views illustrating a method of manufacturing the display substrate in FIG. 2.

Figure 3B:
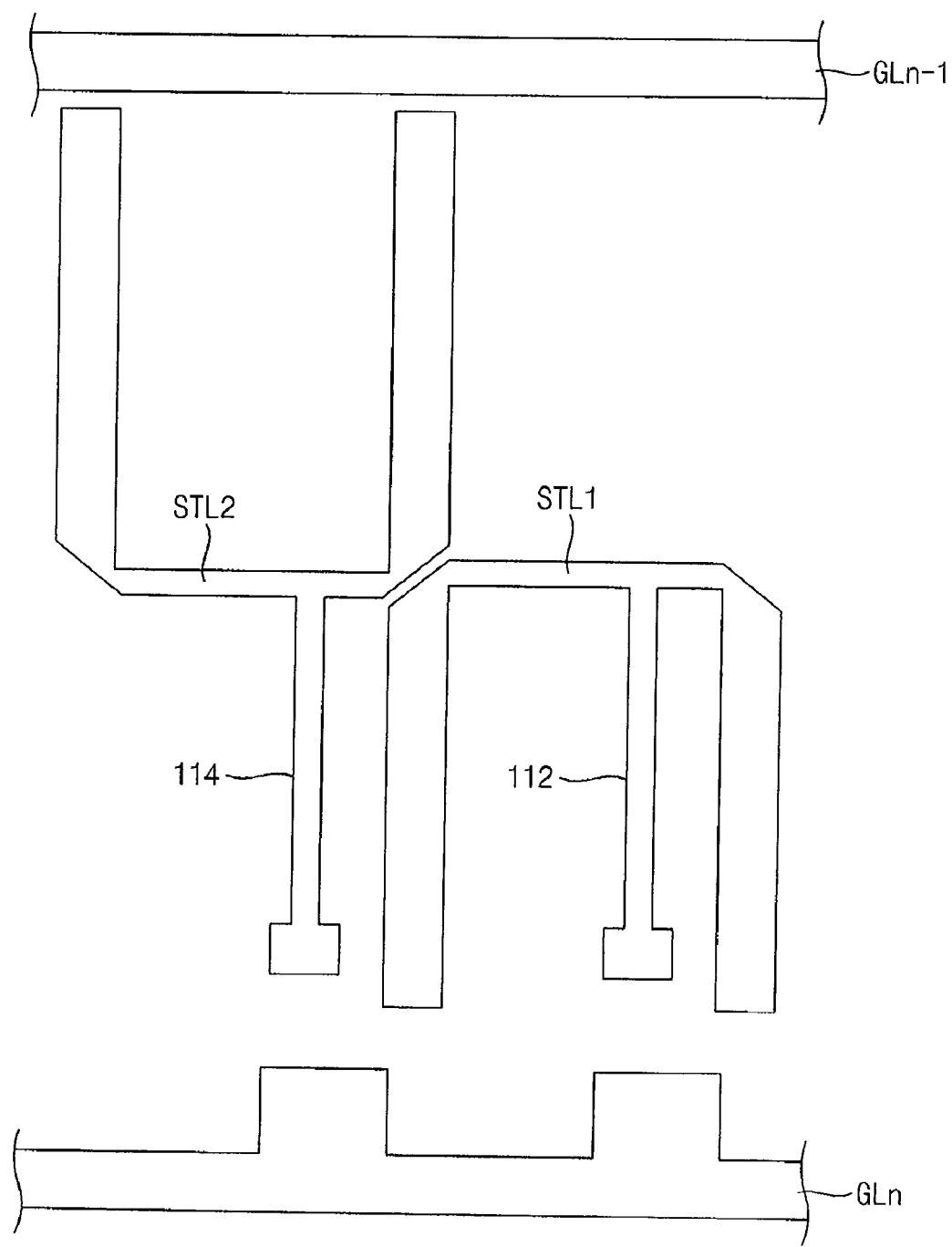
FIGS. 3A to 6 are plan and cross-sectional views illustrating a method of manufacturing the display substrate in FIG. 2.

Referring to FIGS. 3A and 3B, a gate metal layer is deposited on the first base substrate 101 using a deposition, and then is patterned to form a gate pattern. A gate insulation layer 102 is formed on the first base substrate 101 having the gate pattern thereon.

The gate pattern includes an (n−1)th gate line GLn-1, an (n)th gate line GLn, a first storage line STL1, a second storage line STL2, a first gate electrode GE1 and a second gate electrode GE2.

The first and second storage lines STL1 and STL2 formed adjacent to each other are formed at different positions from each other. For example, the first storage line STL1 formed in the first pixel section P1 may be formed in a relatively lower position, which is adjacent to the (n)th gate line GLn, and the second storage line STL2 formed in the second pixel section P2 is formed in a relatively upper position, which is adjacent to the (n−1)th gate line GLn-1.

Each of the first and second storage lines STL1 and STL2 has a U-shape opened toward the adjacent gate lines, respectively. Each of the first and second storage lines STL1 and STL2 includes a first bridge line 112 and a second bridge line 114 that are diverged into the first and second switching elements QS1 and QS2, respectively.

Figure 4A:
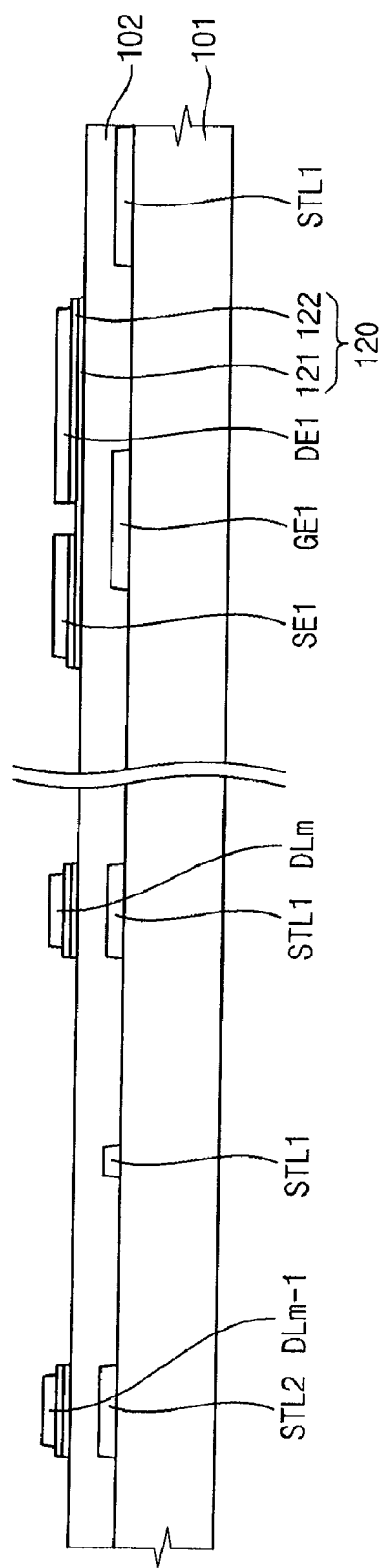
Figure 4B:
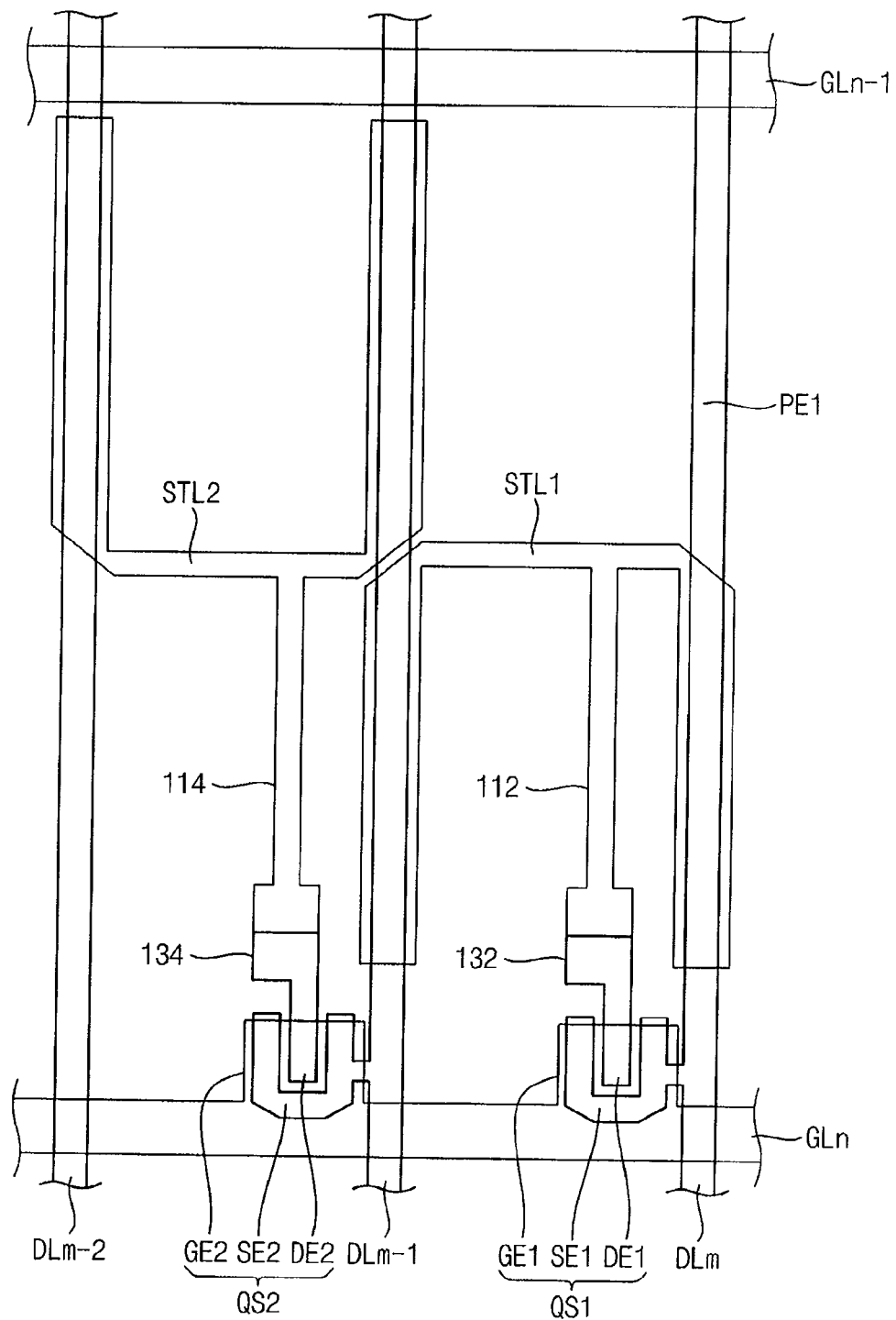

Referring to FIGS. 4A and 4B, the gate insulation layer 102 has a thickness of about 4,000 Å.

A channel layer 120 is formed on the gate insulation layer 102. The channel layer 120 includes an activation layer 121 having amorphous silicon (a-Si) and an ohmic contact layer 122 having n+amorphous silicon (n+a-Si) that is heavily doped with an n-type impurity. A source metal layer is formed on the channel layer 120.

Then, the channel layer 120 and the source metal layer are patterned to form a source pattern. The source pattern includes (m−2)th, (m−1)th and (m)th source lines DLm-2, DLm-1 and DLm, first and second source electrodes SE1 and SE2 and first and second drain electrodes DE1 and DE2.

Lower portions of the (m)th and (m−1)th source lines DLm and DLm-1 are overlapped with the first storage line STL1, and upper portions of the (m−1)th and (m−2)th source lines DLm-1 and DLm-2 are overlapped with the second storage line STL2.

The first drain electrode DE1 includes a first end portion 132 that is partially overlapped with the first bridge line 112 or adjacent to the first bridge line 112 when viewed from a plan view of the display device. The second drain electrode DE2 includes a second end portion 134 that is partially overlapped with the second bridge line 114 or adjacent to the second bridge line 114 when viewed from a plan view of the display device.

Figure 5:
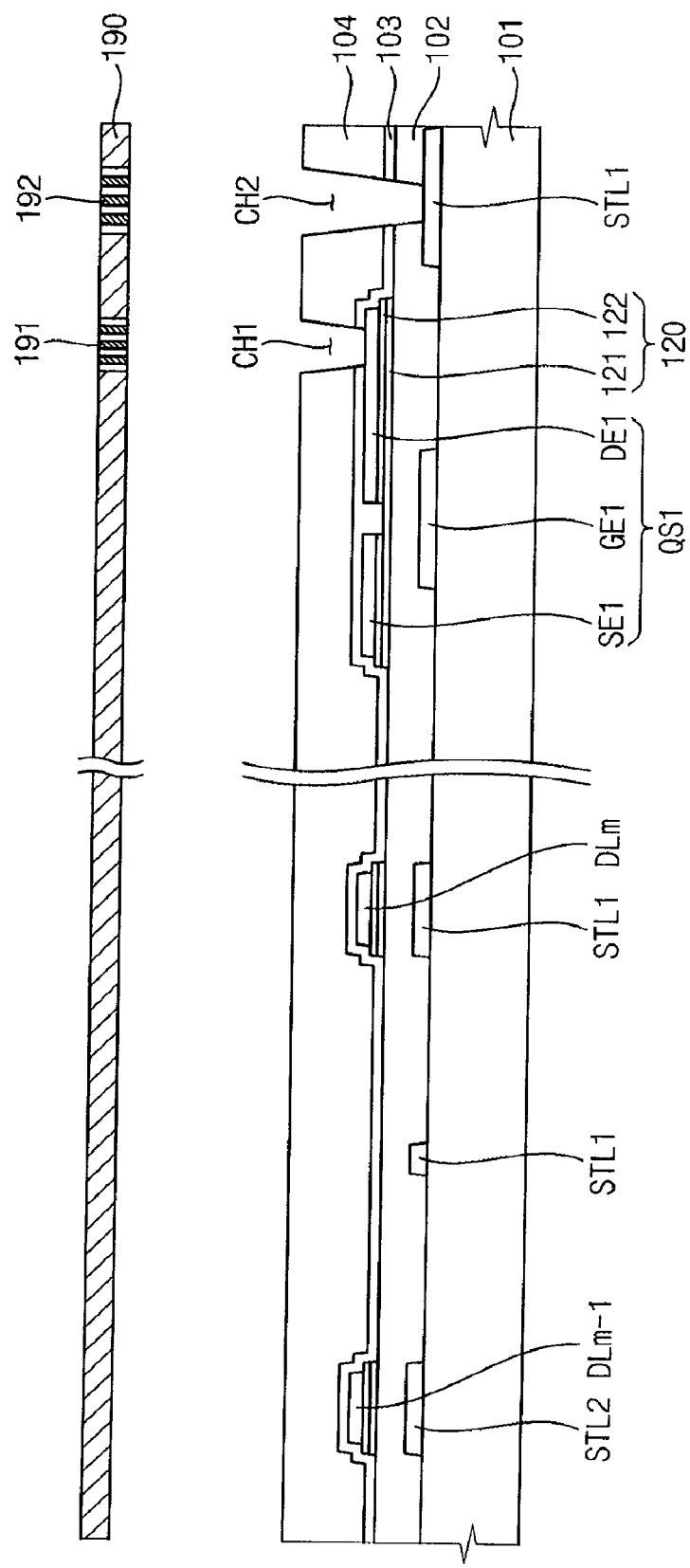

Referring to FIGS. 1 and 5, a passivation layer 103 and an organic insulation layer 104 are sequentially deposited on the first base substrate 101 having the source pattern thereon. For example, the passivation layer 103 may have a thickness of about 2,000 Å, and the organic insulation layer 104 may have a thickness of about 4 μm.

A mask 190 having first and second slit portions 191 and 192 is disposed on the first base substrate 101 having the organic insulation layer 104 formed thereon, and then first and second contact holes CH1 and CH2 are formed to expose an end portion of the first bridge line 112 and end portions 132 and 134 of the first and second drain electrodes.

The first slit portion 191 transmits a relatively low diffraction light and a relatively low interference light in comparison with the second slit portion 192. The organic insulation layer 104 and the passivation layer 103 are removed using the first slit portion 191, thereby forming the first contact hole CH1 that exposes an end portion of the first bridge line 112. The organic insulation layer 104, the passivation layer 103 and the gate insulation layer 102 are removed using the second slit portion 192, thereby forming the second contact hole CH2 that exposes an end portion 132 of the first drain electrode DE1.

Figure 6:
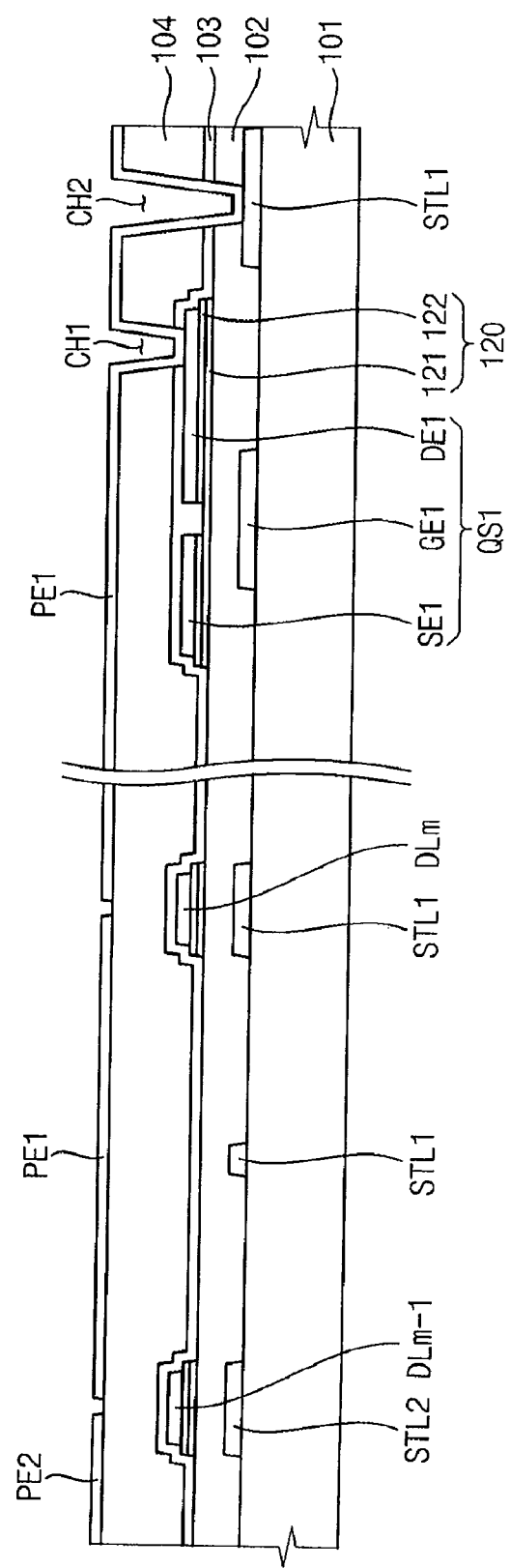

Referring to FIGS. 1 and 6, a transparent electrode layer is deposited on the first base substrate 101 having the first and second contact holes CH1 and CH2, and then is patterned to form a transparent electrode pattern. The transparent electrode pattern includes a first pixel electrode PE1 and a second pixel electrode PE2.

The first pixel electrode PE1 is patterned to overlap the end portions of the (m−1)th and (m)th source lines DLm-1 and DLm, and the second pixel electrode PE2 is patterned to overlap end portions of the (m−1)th and (m−2)th source lines DLm-1 and DLm-2.

Therefore, the first capacitor of the first pixel section P1 is defined by the first storage line STL1, the (m−1)th and (m)th source lines DLm-1 and DLm and the first pixel electrode PE1 that overlap each other. The second storage capacitor of the second pixel section P2 is defined by the second storage line STL2, the (m−1)th and (m−2)th source lines DLm-1 and DLm-2 and the second pixel electrode PE2 that overlap each other.

According to the present exemplary embodiment, it is not necessary to provide additional area for forming a storage line at each of pixel sections because the storage line is formed to overlap the source line. Thus, the aperture ratio of the pixel section may be increased. Moreover, the storage capacitor is designed such that the capacitance ratio ((Cpix-Clc)/Clc) of the pixel section is about 4.5 to about 5.0, thereby optimizing the response time. Moreover, even when the source line and the pixel electrode are misaligned with each other, the variation ratio of the storage capacitance is decreased. Therefore, the "vertical line error" due to variation ratio in the storage capacitance is decreased.

Hereinafter, the same reference numerals will be used to designate the same components as those described in the above Exemplary Embodiment 1 and the descriptions thereof will be omitted.

Exemplary Embodiment 2

Figure 7:
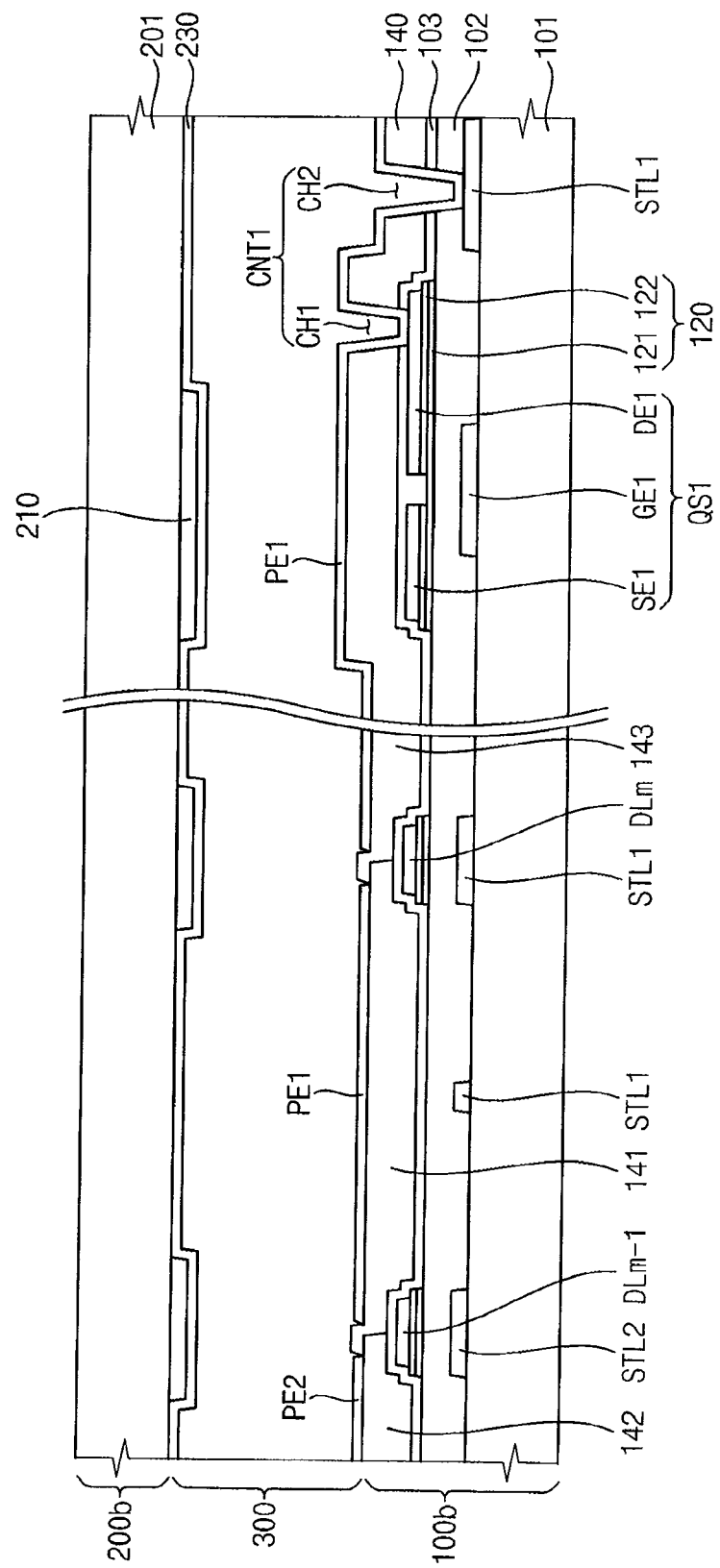
FIG. 7 is a cross-sectional view illustrating a display device according to a second exemplary embodiment of the present invention.

FIG. 7 is a cross-sectional view illustrating a display device according to a second exemplary embodiment of the present invention.

Referring to FIGS. 1 and 7, the display device includes a display substrate 100b, an opposite substrate 200b that faces the display substrate 100b and a liquid crystal layer 300 interposed between the substrates 100b and 200b.

The display substrate 100b includes, as shown in FIG. 2, gate patterns GLn-1, GLn, STL1, STL2, GE1 and GE2, a gate insulation layer 102, source patterns DLm-2, DLm-1, DLm, SE1, SE2, DE1 and DE2 and a passivation layer 103 that are sequentially formed on a first base substrate 101. A color filter layer 140 is formed on the passivation layer 103. The color filter layer 140 may include a red filter pattern 141, a blue filter pattern 142 and a green filter pattern 143.

The opposite substrate 200b includes a second base substrate 201, a light-blocking pattern 210 and a common electrode 230. The light-blocking pattern 210 is formed on the second base substrate 201. The common electrode 230 is formed on the second base substrate 201 having the light-blocking pattern 210 formed thereon.

Exemplary Embodiment 3

Figure 8:
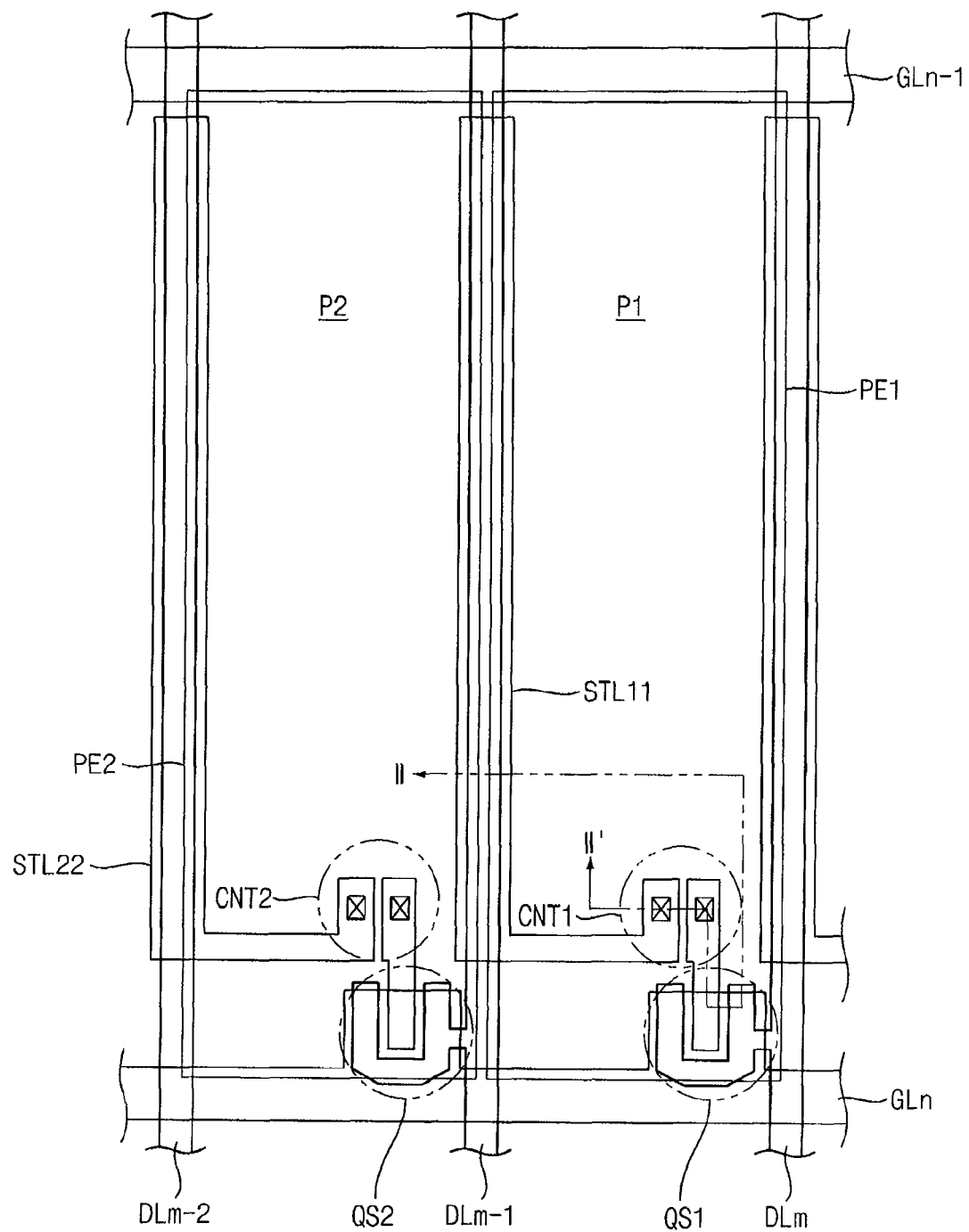
FIG. 8 is a plan view illustrating a display device according to a third exemplary embodiment of the present invention.

FIG. 8 is a plan view illustrating a display device according to a third exemplary embodiment of the present invention.

Referring to FIG. 8, a display device includes a plurality of gate lines GLn-1 and GLn, a plurality of storage lines STL11 and STL22, a plurality of source lines DLm-2, DLm-1 and DLm, a plurality of switching elements QS1 and QS2, and a plurality of pixel electrodes PE1 and PE2, wherein m and n are natural numbers.

The gate lines GLn-1 and GLn are extended along a first direction, and the source lines DLm-2, DLm-1 and DLm are extended along a second direction crossing the first direction. The gate lines GLn-1 and GLn and the source lines DLm-2, DLm-1 and DLm define a first pixel area and a second pixel area. The storage lines STL11 and STL22 are formed to overlap with the source lines DLm-2, DLm-1 and DLm corresponding to the storage lines STL11 and STL22.

A first pixel section P1 is formed in the first pixel section. The first pixel section P1 includes a first switching element QS1, a first storage line STL11 and a first pixel electrode PE1. The first switching element QS1 is electrically connected to an (n)th gate line GLn and an (m)th source line DLm. The first storage line STL11 is formed below (m−1)th and (n)th source lines DLm-1 and DLm to overlap the (m−1)th and (n)th source lines DLm-1 and DLm, as seen in plan view. The first pixel electrode PE1 is electrically connected to the first switching element QS1 and the first storage line STL11 through a first contact hole CNT1.

The first storage line STL11 is formed to overlap one of the (m−1)th and (m)th source lines DLm-1 and DLm that define the first pixel area. The first storage line STL11 is formed to overlap the (m−1)th source line DLm-1, which is a previous stage of the (m)th source line DLm electrically connected to the first switching element QS1.

The first pixel electrode PE1 is partially overlaps the (m−1)th and (m)th source lines DLm-1 and DLm.

A first storage capacitor of the first pixel section P1 is defined by the first storage line STL11, the (m−1)th source line DLm-1 and the first pixel electrode PE1 that are overlap each other.

A second pixel section P2 is formed in the second pixel section. The second pixel section P2 includes a second switching element QS2, a second storage line STL22 and a second pixel electrode PE2. The second switching element QS2 is electrically connected to an (n)th gate line GLn and an (m−1)th source line DLm-1. The second storage line STL22 is formed below an (m−2)th source line DLm-2 to overlap the (m−2)th source line DLm-2 when viewed from a plan view of the display device. The second pixel electrode PE2 is electrically connected to the second switching element QS2 and the second storage line STL22 through a second contact hole CNT2.

The second storage line STL22 is formed to overlap one of the (m−2)th and (m−1)th source lines DLm-2 and DLm-1 that define the second pixel area. Here, the second storage line STL22 is formed to overlap the (m−2)th source line DLm-2, which is a previous stage of the (m−1)th source line DLm-1 electrically connected to the second switching element QS2.

The second pixel electrode PE2 is formed to overlap end portions of the (m−2)th and (m−1)th source lines DLm-2 and DLm-1, as seen in plan view.

A second storage capacitor of the second pixel section P2 is defined by the second storage line STL11, the (m−2)th source line DLm-2 and the second pixel electrode PE2 that overlap each other.

According to the present exemplary embodiment, the storage line is formed to overlap the source line, so that the aperture ratio of the pixel section may be increased. Moreover, a storage capacitor is designed such that the capacitance ratio ((Cpix-Clc)/Clc) of the pixel section is about 4.5 to about 5.0, thereby optimizing the response time. Moreover, when the source line and the pixel electrode are misaligned with each other, the variation ratio of the storage capacitance may be decreased. Therefore, the "vertical line error" due to the variation ratio of the storage capacitance may be decreased.

Figure 9:
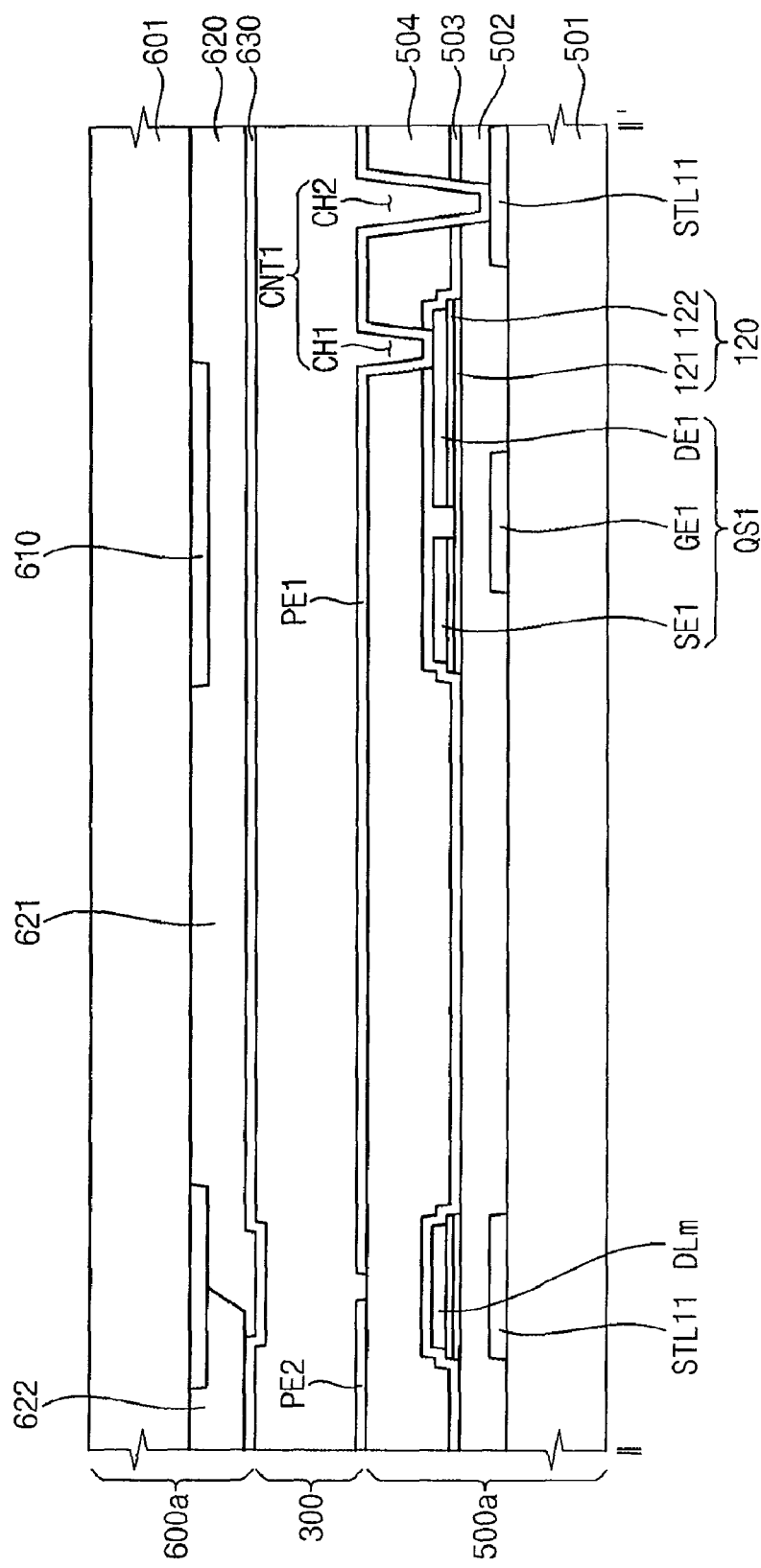
FIG. 9 is a cross-sectional view illustrating a display device cut along a line 11-11' in FIG. 8.

FIG. 9 is a cross-sectional view illustrating a display device cut along a line II-II' in FIG. 8.

Referring to FIGS. 8 and 9, a display device includes a display substrate 500a, an opposite substrate 600a facing the display substrate 500a and a liquid crystal layer 300 interposed between the display substrate 500a and the opposite substrate 600a.

The display substrate 500a includes a first base substrate 501. A gate pattern as a gate metal layer is formed on the first base substrate 501. The gate pattern includes an (n−1)th gate line GLn-1, an (n)th gate line GLn, a first storage line STL11, a second storage line STL22, a first gate electrode GE1 and a second gate electrode GE2.

A gate insulation layer 502 is formed on the first base substrate 501 having the gate pattern formed thereon. A source pattern including a channel layer 120 and a source metal layer is formed on the gate insulation layer 502. The source pattern includes a plurality of source lines DLm-2, DLm-1 and DLm, a first source electrode SE1, a second source electrode SE2, a first drain electrode DE1, a second drain electrode DE2. The source lines DLm-2, DLm-1 and DLm are formed to overlap the first and second storage lines STL11 and STL22.

A passivation layer 503 and an organic insulation layer 504 are sequentially formed on the first base substrate 501 having the source pattern formed thereon.

A first pixel electrode PE1 and a second pixel electrode PE2 are formed on the organic insulation layer 504. The first pixel electrode PE1 is electrically connected to the first switching element QS1 through the first contact hole CNT1, and the second pixel electrode PE2 is electrically connected to the second switching element QS2 through the second contact hole CNT2.

For example, the first pixel electrode PE1 may be electrically connected to an end portion of the first drain electrode DE1 that is exposed through the first contact hole CH1, and may be electrically connected to an end portion of the first storage line STL11 that is exposed through the second contact hole CH2.

As a result, the first storage capacitor of the first pixel section P1 is defined by the first storage line STL11, the gate insulation layer 502 formed on the first storage line STL11, the (m−1)th source line DLm-1 formed on the gate insulation layer 502, the passivation layer 503 formed on the (m−1)th source line DLm-1, the organic insulation layer 504 formed on the passivation layer 503, and the first pixel electrode PE1 formed on the organic insulation layer 504.

Although not shown in FIGS. 8 and 9, the second storage capacitor of the second pixel section P2 is defined by the second storage line STL22, the gate insulation layer 502 formed on the second storage line STL22, the (m−2)th source line DLm-2 formed on the gate insulation layer 502, the passivation layer 503 formed on the (m−2)th source line DLm-2, the insulation layer 504 formed on the passivation layer 503, and the second pixel electrode PE2 formed on the organic insulation layer 504.

The opposite substrate 600a includes a second base substrate 601. A light-blocking pattern 610 is formed on the second base substrate 601. For example, the light-blocking pattern 610 may be formed corresponding to the gate lines GLn-1 and GLn, the source lines DLm-2, DLm-1 and DLm and the switching elements QS1 and QS2.

A color filter layer 620 is formed in a light-transmitting area defined by the light-blocking pattern 610. A common electrode 630 facing the first and second pixel electrodes PE1 and PE2 is formed on the color filter layer 620.

Exemplary Embodiment 4

Figure 10:
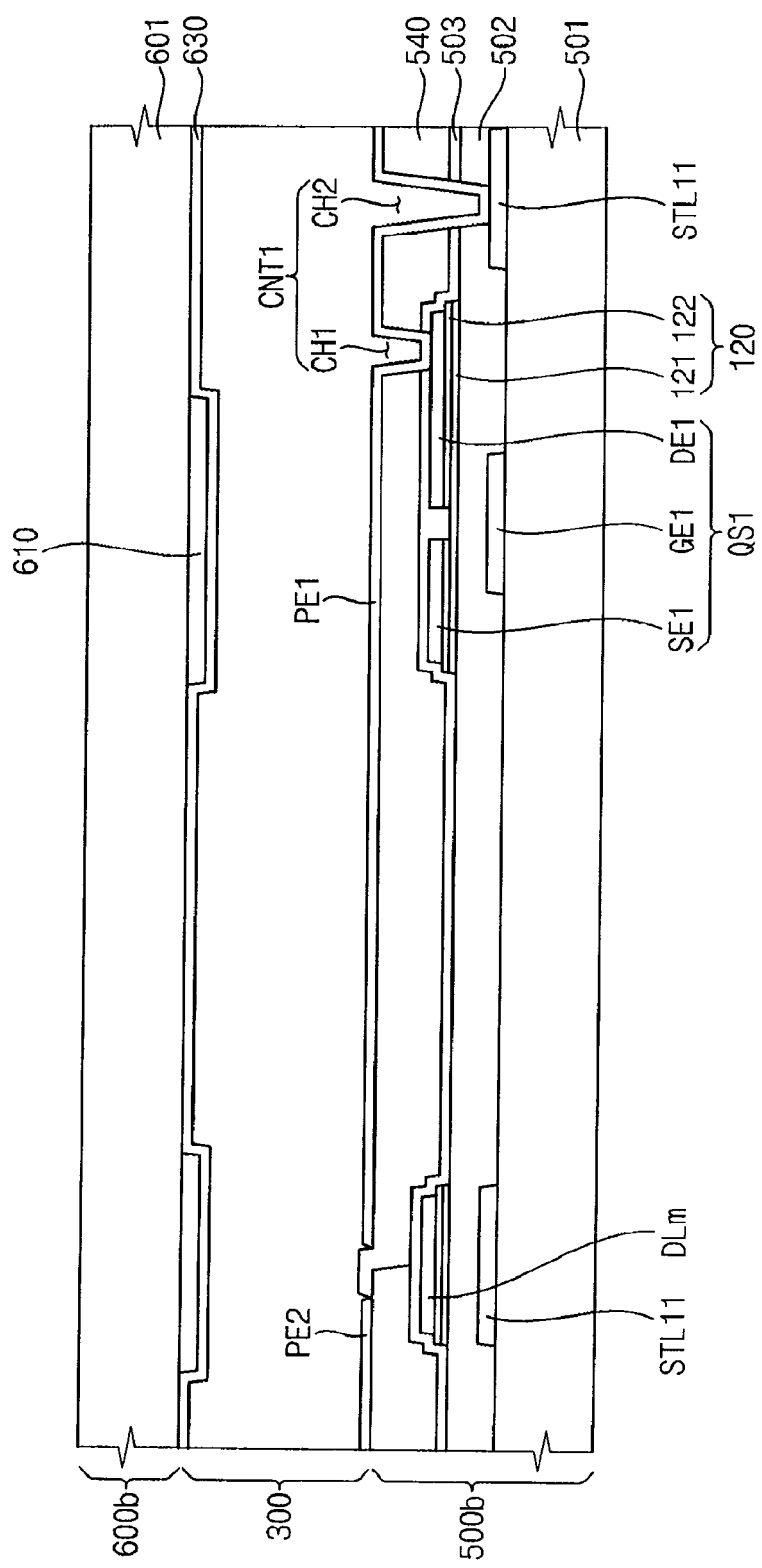
FIG. 10 is a plan view illustrating a display device according to a fourth exemplary embodiment of the present invention.

FIG. 10 is a plan view illustrating a display device according to a fourth exemplary embodiment of the present invention.

Referring to FIGS. 8 and 10, a display device includes a display substrate 500a, an opposite substrate 600a facing the display substrate 500a and a liquid crystal layer 300 interposed between the display substrate 500a and the opposite substrate 600a.

The display substrate 500a includes gate patterns GLn-1, GLn, STL11, STL22, GE1 and GE2, a gate insulation layer 502, source patterns DLm-2, DLm-1, DLm, SE1, SE2, DE1 and DE2 and a passivation layer 503 that are sequentially formed on a first base substrate 501, wherein m and n are natural numbers. A color filter layer 540 is formed on the passivation layer 503.

The opposite substrate 600b includes a second base substrate 601, a light-blocking pattern 610 and a common electrode 630. The light-blocking pattern 610 is formed on the second base substrate 601. The common electrode 630 is formed on the second base substrate 601 having the light-blocking pattern 610 formed thereon.

According to the above exemplary embodiment, the storage line is formed to overlap the source line in an area formed the source line, so that the aperture ratio of the pixel section may be increased. Furthermore, the capacitance ratio (Cpix-Clc)/Clc) of the pixel section is designed to be about 4.5 to about 5.0, thereby optimizing the response time of the liquid crystal display (LCD) device.

Following Table 1 shows simulation results for the Exemplary Embodiments 1 to 4 according to the present invention.

TABLE 1

|  | Exemplary Embodiment 1 | Exemplary Embodiment 2 | Exemplary Embodiment 3 | Exemplary Embodiment 4 |
| --- | --- | --- | --- | --- |
| Cst [pF] | 0.1894 | 0.1963 | 0.2159 | 0.2159 |
| Cpix − Clc [pF] | 0.259 | 0.266 | 0.285 | 0.285 |
| Clc [pF] | 0.604 | 0.604 | 0.604 | 0.604 |
| (Cpix − Clc)/Clc | 0.43 | 0.44 | 0.47 | 0.47 |
| Aperture ratio [%] | 73 | 72 | 75 | 74 |

Referring to Table 1, the capacitance ratio ((Cpix-Clc)/Clc) according to Exemplary Embodiment 1 is about 0.43, and the aperture ratio according to Exemplary Embodiment 1 is about 73%. The capacitance ratio ((Cpix-Clc)/Clc) according to Exemplary Embodiment 2 is about 0.44, and the aperture ratio according to Exemplary Embodiment 2 is about 72%. The capacitance ratio ((Cpix-Clc)/Clc) according to Exemplary Embodiment 3 is about 0.47, and the aperture ratio according to Exemplary Embodiment 3 is about 75%. The capacitance ratio ((Cpix-Clc)/Clc) according to Exemplary Embodiment 4 is about 0.47, and the aperture ratio according to Exemplary Embodiment 4 is about 74%.

According to the Exemplary Embodiments of the present invention, the capacitance ratio ((Cpix-Clc)/Clc) is maintained at about 0.43 to about 0.47, so that the response time of about 16 ms may be obtained. Furthermore, a high aperture ratio of about 72 to about 75% may be obtained.

According to the present invention, a storage line is formed to overlap a source line, thereby avoiding the decrease in aperture ratio experienced with conventional storage line construction. Moreover, because the size of the storage line is designed within an area corresponding to the source line, the capacitance ratio ((Cpix-Clc)/Clc) is maintained. Thus, the response time of the LCD device may be optimized.

Moreover, when the source line and a pixel electrode are misaligned with each other, the variation ratio of a storage capacitance using the storage line formed below the source line is decreased. Thus, the "vertical line error" due to variation ratio in the storage capacitance may be decreased.

Therefore, the aperture ratio, response time and a "vertical line error" may be optimized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display substrate comprising:
   a gate line;
   a source line crossing the gate line;
   a storage line formed from the same layer as the gate line, the storage line partially overlapping the source line; and
   a pixel electrode partially overlapping the source line to define a pixel area, the pixel electrode being electrically connected to the storage line.

2. The display substrate of claim 1, further comprising:
   an organic insulation layer formed between the source line and the pixel electrode.

3. The display substrate of claim 1, further comprising:
   a color filter layer formed between the source line and the pixel electrode.

4. The display substrate of claim 1, further comprising:
   a switching element electrically connected to an (n)th gate line and an (m)th source line, wherein 'm' and 'n' are natural numbers.

5. The display substrate of claim 4, wherein the storage line overlaps the (m)th source line and (m−1)th source line, and is formed in one of an upper portion of the pixel area and a lower portion of the pixel area when seen in plan view.

6. The display substrate of claim 5, wherein the storage line has a U-shape that is opened toward the (n)th gate line or an (n−1)th gate line.

7. The display substrate of claim 4, wherein the storage line overlaps the (m)th source line or (m−1)th source line, as seen in plan view.

8. A display device comprising:
   a switching element electrically connected to a gate line and a source line crossing each other;
   a liquid crystal capacitor having a pixel electrode electrically connected to the switching element through a first contact to define a pixel area; and
   a storage capacitor having a storage line partially overlapping the source line, the storage line electrically connected to the pixel electrode through a second contact hole.

9. The display device of claim 8, wherein the capacitance ratio ((Cpix-Clc)/Clc) between the liquid crystal capacitor and the storage capacitor is in a range of about 0.4 to about 0.6,
   wherein Cpix denotes the total capacitance of a capacitor formed in the pixel area, Clc denotes the capacitance of the liquid crystal capacitor, and Cst denotes the capacitance of the storage capacitor.

10. The display device of claim 9, wherein the liquid crystal capacitor is defined by the pixel electrode, a common electrode facing the pixel electrode and a liquid crystal layer interposed between the pixel electrode and the common electrode.

11. The display device of claim 9, wherein the storage capacitor comprises the storage line, a gate insulation layer formed on the storage line, a source line formed on the gate insulation layer that overlaps the storage line, an organic insulation layer formed on the source line, and the pixel electrode partially overlapped by the source line.

12. The display device of claim 9, wherein the storage capacitor comprises the storage line, a gate insulation layer formed on the storage line, a source line formed on the gate insulation layer overlapped by the storage line, a color filter layer formed on the source line, and the pixel electrode partially overlapped by the source line.

13. The display device of claim 9, wherein the switching element comprises a gate electrode electrically connected to an (n)th gate line, a source electrode electrically connected to an (m)th source line, and a drain electrode electrically connected to the source electrode, wherein 'm' and 'n' denote a natural number.

14. The display device of claim 13, wherein the storage line overlaps the (m)th source line and the (m−1)th source line, and is formed in one of an upper portion of the pixel area and a lower portion of the pixel area when viewed on a plan.

15. The display device of claim 14, wherein the storage line has a U-shape that is opened toward the (n)th gate line or the (n−1)th gate line.

16. The display device of claim 13, wherein the storage line overlaps the (m)th source line or the (m−1)th source, as seen in plan view.

17. A method of manufacturing a display substrate comprising:

forming a storage line on each of pixel areas of a base substrate having a plurality of pixel areas defined thereon;

forming a gate insulation layer on the storage line;

forming a source line on the gate insulation layer, the source line overlapping the storage line; and forming a pixel electrode on the source line to overlap a portion of the source line.

18. The method of claim 17, further comprising:

forming an organic insulation layer between the source line and the pixel electrode.

19. The method of claim 17, further comprising:

forming a color filter layer between the source line and the pixel electrode.

20. The method of claim 17, further comprising:

forming a contact hole that exposes an end portion of the storage line, wherein the pixel electrode is contacted by the end portion of the storage line through the contact hole.

* * * * *